United States Patent [19]

Iwanade

[11] Patent Number: 4,557,593
[45] Date of Patent: Dec. 10, 1985

[54] FOCUS AND MAGNIFICATION DETERMINING AND CONTROL DEVICE FOR VARIABLE MAGNIFICATION TYPE COPYING MACHINE

[75] Inventor: Hisao Iwanade, Tokyo, Japan
[73] Assignee: Asahi Kogaku Kogyo Kabushiki Kaisha, Tokyo, Japan
[21] Appl. No.: 641,670
[22] Filed: Aug. 17, 1984
[30] Foreign Application Priority Data
Aug. 24, 1983 [JP] Japan .............................. 58-154414
[51] Int. Cl.⁴ ............................................. G03B 27/34
[52] U.S. Cl. ........................................ 355/57; 355/59
[58] Field of Search ...................... 355/55, 56, 57, 58, 355/59
[56] References Cited
U.S. PATENT DOCUMENTS
4,322,159 3/1982 Takahashi et al. .................. 355/57
4,335,953 6/1982 Tsuchiya et al. .................... 355/57
4,383,274 5/1983 Inuiya ................................... 355/56

*Primary Examiner*—Monroe H. Hayes
*Attorney, Agent, or Firm*—Sughrue, Mion, Zinn, Macpeak & Seas

[57] ABSTRACT

A variable magnification type copying machine has a zoom lens disposed between a platen and a photosensitive surface, the zoom lens being composed of a plurality of movable lenses. A chart located on the platen in a position not to interfere with the placement of an original on the platen projects an image of itself into a line sensor. The line sensor outputs video determination signals indicative of the focus and magnification of the zoom lens. The magnification determination signals operate a stepping motor which positions the zoom lens for the desired magnification. The focus determination signals operate a stepping motor to adjust the distance between movable lens to obtain optimum focus.

16 Claims, 7 Drawing Figures

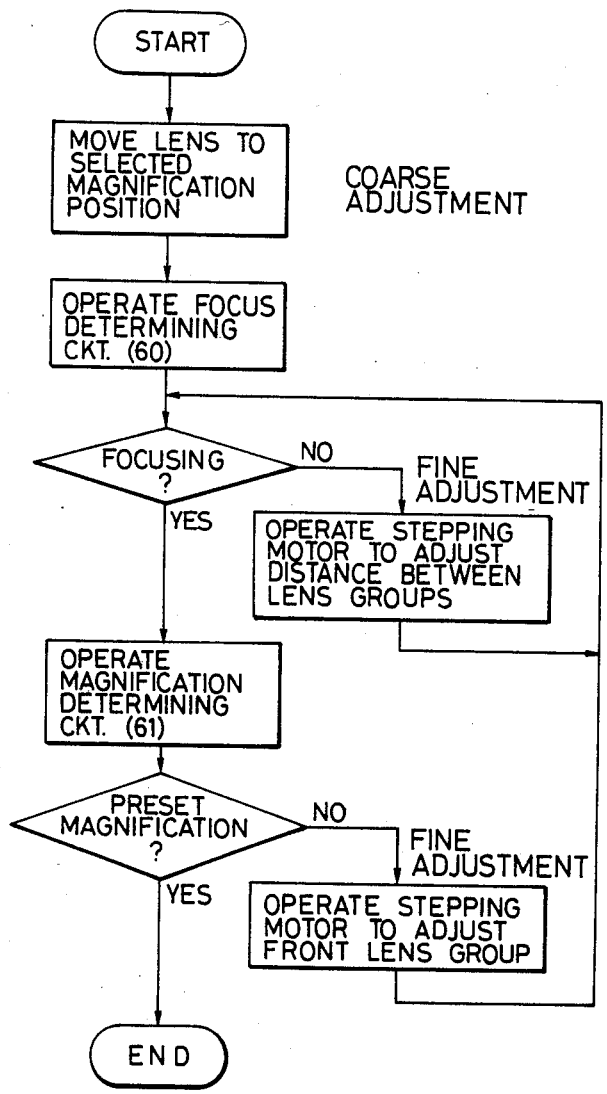

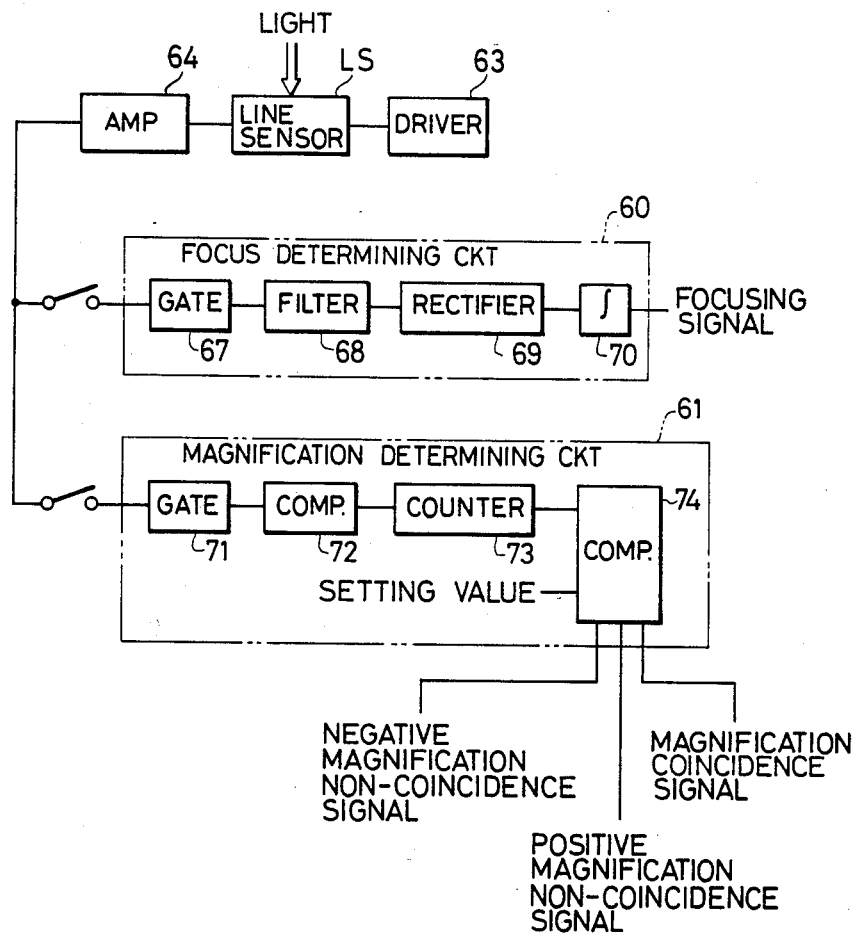

FOCUS AND MAGNIFICATION DETERMINING AND CONTROL DEVICE FOR VARIABLE MAGNIFICATION TYPE COPYING MACHINE

BACKGROUND OF THE INVENTION

This invention relates to a variable magnification type copying machine with a zoom lens. More particularly, it relates to a focus and magnification determining and control device which provides proper focus and magnification irrespective of temperature variations and component deterioration.

In variable magnification copying machines with a zoom lens, magnification is changed by moving the movable lenses of the zoom lens. Any variations in the distance between the objject on the machine platen and the image receiving photosensitive surface is compensated for by adjusting the distance between the movable lenses by means of a cam or the like. However, in the conventional copying machine, the positions of the movable lenses of the zoom lens relative to the platen and photo sensitive surface and the distances between the movable lenses themselves are predetermined according to optical calculation values which correspond to given copying magnifications for given component values and operating conditions. Therefore, should there be temperature changes or changes in component parameters due to deterioration, manufacturing variations, or the like, incorrect focus and magnification result. Such incorrect focuses and magnification settings give rise to inferior picture quality. Thus, it was necessary to manufacture copying machine components with a high degree of accuracy, and accordingly, the conventional copying machine has an unavoidably high manufacturing cost.

SUMMARY OF THE INVENTION

According to the teachings of the invention, proper focus and magnification is realized without resorting to highly accurate components.

In accordance with a specific feature of the invention, the positions of the movable lenses of the zoom lens relative to the copying machine platen and photosensitive surface as well as the lenses themselves are initially determined according to optical calculation values corresponding to given magnifications. Thereafter, these initial lens positions and distances are finely adjusted according to signals from a sensor adapted to receive the image of a chart positioned at a corner of the platen for receiving an original to be copied. The fine adjustment process overcomes the above-described out of focus and improper magnification problems resulting from component parameter changes due to temperature changes, manufacturing variations and other causes of component deterioration. Therefore, in manufacturing a copying machine using the teachings of this invention it is unnecessary to use highly accurate components as are necessary in the conventional copying machine.

BRIEF DESCRIPTION OF THE DRAWINGS

FIG. 6 is a flow chart of one example of the operation of a copying machine equipped with the device of the invention.

FIG. 7 is a block diagram showing one example of a sensor drive circuit for use with the device of the invention.

DETAILED DESCRIPTION OF THE PREFERRED EMBODIMENT

Figure 1:
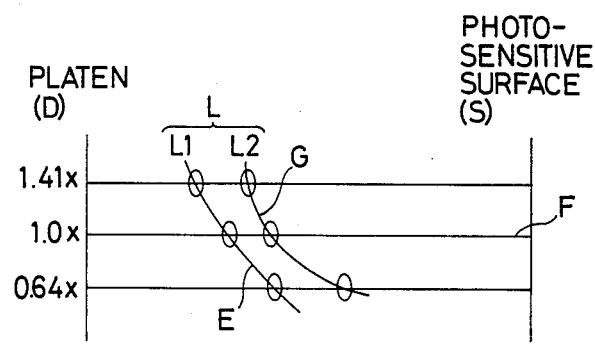
FIG. 1 is a diagram depicting the position changes in response to magnification changes of a front lens group and a rear lens group situated between an original surface and a photosensitive surface.

FIG. 1 shows the positions of a movable front lens group L1 and a movable rear lens group L2 relative to the platen D and the photosensitive surface S and relative to each other in the direction of the optical axis F at magnifications $0.64\times$, $1.00\times$ and $1.41\times$. The front and rear lens groups form a copying zoom lens L. As the positions of the original platen D and photosensitive surface S are fixed (with the result that the distance between the object on the platen and its image on the photosensitive surface is also fixed), the positions of the lens groups L1 and L2 and the distance therebetween must be changed as shown in FIG. 1, in order to, at all times, obtain an image of excellent picture quality (which requires bringing the object into focus) with different magnifications.

Figure 2:
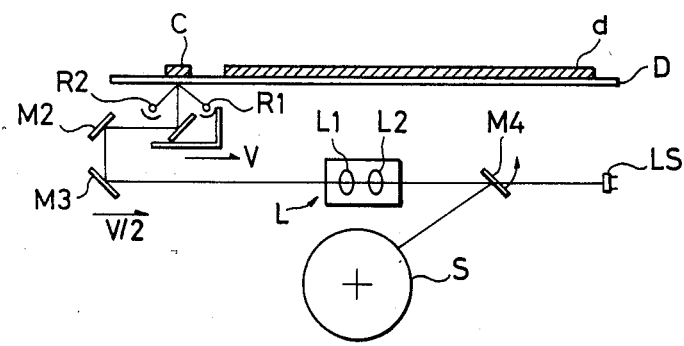
FIG. 2 is a diagram of a focus and magnification control device for a copying machine according to the teachings of the invention.

FIG. 2 is an explanatory diagram outlining the fundamental arrangement of a conventional copying machine satisfying the abovedescribed condition, modified according to the teachings of the present invention. In FIG. 2, the copying machine includes an original platen D, and a zoom lens L, consisting of a front lens group L1 and a rear leans group L2 which can be positioned as illustrated in FIG. 1. A photosensitive surface S is provided as part of a photosensitive drum. The original platen D is a transparent plate (such as a transparent glass plate). A full speed mirror M1 movable together with an illuminating lamp R1 is provided below the original surface D. Optical path changing mirrors M2 and M3 are adapted to receive light reflected from the full speed mirror M1. These mirros M2 and M3 are so supported that they are movable together. In order to maintain the optical path length unchanged, the mirrors M2 and M3 are moved at half the speed of the full speed mirror M1 and in the same direction as the mirror M1. Therefore, the mirrors M2 and M3 are called "half speed mirrors". The direction of the light beam reflected from the full speed mirror M1 is rotated 180° by the optical path changing mirrors M2 and M3, and applied through the zoom lens L to a fourth mirror M4. The fourth mirror M4 reflects the light beam so that it is applied to the photosensitive drum S. Drum S is rotated in synchronization with the scanning speed of the full speed mirror M1 (speed of the full speed mirror $M1 = (1/\text{magnification}) \times$ peripheral speed of the drum S). Conventionally, in order to change the magnification, the movable lens groups L1 and L2 of the zoom lens L are moved along the optical axis, and the distance between the lens groups is set to that which has been described with reference to FIG. 1.

The invention has the following arrangement in addition to the above-described arrangement. A chart C is provided at a corner of the original platen D where it will not interfere with the placing of an original (d). A stationary lamp R2 is provided below the original platen D to illuminate the chart C. The chart C is flush with the original d. That is, it lies in the same horizontal plane as the original d. The image of the chart C is applied to the full speed mirror M1. The fourth mirror M4 is made rotatable so that the light beam passing through the zoom lens L is applied to either the photosensitive drum S or a line sensor LS depending on the position of mirror M4. The line sensor LS is made up of a number of minute sensor elements arranged in a line and is set at a position which is in conjugation with the position of the photosensitive surface S. That is, the line sensor LS is positioned at a location optically equivalent to the location of the photosenstive surfaces. Therefore, the focus and magnification of the image of original d on the original platen D can be detected by detecting the image of the chart C as seen by the line sensor LS.

According to the teachings of the invention, before an original d is copied, the fourth mirror M4 is rotated to apply the image of the chart C to the line sensor LS to perform focus and magnification detections. The line sensor LS produces signal outputs which may be used to finely change the positions of the movable lens groups L1 and L2 of the zoom lens L and the distance therebetween to give a correct focus and a correct magnification.

Figure 3:
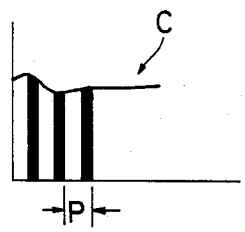
FIG. 3 is a plan view of a reference chart used in the focus and magnification device of the invention.

The chart C is, for instance, a test chart used for testing a lens resolving power. One example of such a test chart is shown in FIG. 3. This test chart may contain many alternating white and black lines with a line pair p dimensioned 1p/mm. The contrast of the chart is utilized for obtaining a correct focus, while a correct magnification is determined from the number of white and black lines counted during a predetermined gating period. The dimension of the line pair p is determined according to the required range of magnifications, the size of the picture elements in the line sensor LS and the required resolving power.

Figure 4:
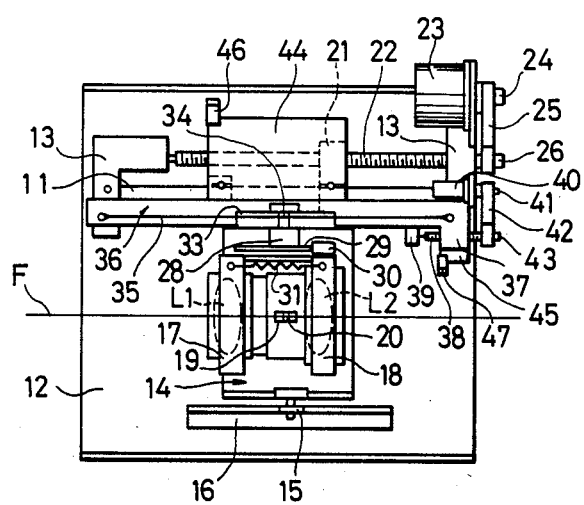
FIG. 4 is a plan view of a zoom lens positioning mechanism for use in the focus and magnification device of the invention.
Figure 5:
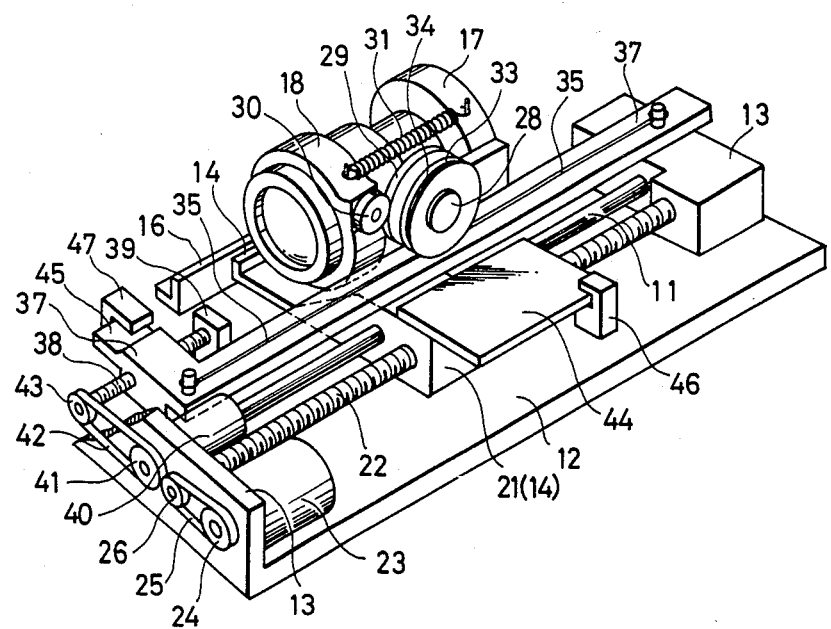
FIG. 5 is a perspective view of a portion of the focus and magnification device of this invention and particularly the zoom lens position control mechanism.

A lens moving mechanism for moving the movable lens groups of the zoom lens will be described with reference to FIGS. 4 and 5. In the lens moving mechanism, the force for moving the front lens group L1 is utilized to move the rear lens group L2 with the aid of a cam means. In FIGS. 4 and 5, reference character F designates the optical axis of the zoom lens L, and reference numeral 11 designates a guide rod which is laid in parallel with the optical axis F and is fixedly secured to support brackets 13 and 13 on a base 12. A zoom lens stand 14 is slidably mounted on the guide rod 11 at one end (the upper end in FIG. 4). A guide roller 15 is provided at the other end of the zoom lens stand 14 in such a manner that it rolls along a guide rail 16 which is fixed in parallel with the guide rod 11.

The front lens group L1 is supported by a first lens barrel 17 which is fixedly mounted on the zoom lens stand 14. The rear lens group L2 is supported by a second lens barrel 18. The second lens barrel 18 is slidably fitted on the first lens barrel 17 in such a manner that the lens barrels 17 and 18 are coaxial with each other and the optical axis of the former coincides with that of the latter. That is, with respect to the zoom lens stand 14, the first lens barrel 17 is stationary, and the second lens barrel 18 is movable.

With further reference to FIGS. 4 and 5, reference numeral 19 designates an elongated hole and numeral 20 a pin engaging the elongated hole 19 for controlling the slide direction and range of the second lens barrel 18. An arm 21 is extended from the zoom lens stand 14 and is engaged with a feed screw 22 which is laid in parallel with the guide rod 11 and is supported by the support brackets 13. The feed screw 22 is turned by drive means comprising a positon controllable stepping motor (or a pulse motor) 23, a timing pulley 24, a timing belt 25 and a timing pulley 26.

As the feed screw 22 is turned, the zoom lens stand 14 is moved along the guide roll 11, and accordingly, the zoom lens L, consisting of the front lens group L1 and the rear lens group L2, is moved along the optical axis F thereby changing the magnification. That is, to change the magnification, the zoom lens stand 14 is moved along a locus E defining the positions of the front lens group L1 as shown in FIG. 1. Accordingly, the front lens group supported by the first lens barrel 17 which is fixedly mounted on the zoom lens stand 14 describes the locus E.

Now, a distance adjusting mechanism will be described in which movement of the zoom lens stand 14 is utilized to move the second lens barrel 18 with respect to the first lens barrel 17 to thereby control the distance between the two lens groups 17 and 18 according to a desired copying magnification.

A shaft 28 is supported on the zoom lens stand 14 in such a manner that it is perpendicular to the optical axis F. A distance adjusting member, namely, a cam plate 29 is rotatably mounted on the shaft 28. A cam follower 30 is supported by the second lens barrel 18 such that it protrudes therefrom to engage the peripheral cam surface of the cam plate 29. The cam plate 29 is maintained elastically abutted against the cam follower 30 by a tension spring 31. Accordingly, as the cam plate 29 rotates, the second lens barrel 18 is moved along the optical axis F under the control of the cam surface of the cam plate 29. The cam plate 29 is shaped so as to move the rear lens group L2 supported by the second lens barrel 18 along the locus G shown in FIG. 1 as the lens stand 14 moves.

A wire pulley 33 is mounted on the shaft of the cam plate 29. The wire pulley 33 is rotatable relative to the cam plate for phase adjustment, and then fixedly secured to the shaft of the cam plate 29 after the phase adjustment. A wire 35 is wound on the wire pulley 33 and fixed thereto with a screw 34 so that it may not slip. Both ends of the wire rope 35 are fixedly secured to both ends of a fine adjustment rod 36. The fine adjustment rod 36 is in parallel with the guide rod 11 and is slidably supported by the support brackets 13 and 13 at both ends. An arm 37 is extended from one end of the fine adjustment rod 36, and it is engaged with a feed screw 38 The feed screw 38 is supported through a bracket 39 by the base 12. The feed screw 38 is rotated by drive means comprising a position controllable stepping motor (or a pulse motor) 40, a timing pulley 41, a timing belt 42 and a timing pulley 43. Position detecting plates 44 and 45 are fixedly secured to the zoom lens stand 14 and the fine adjustment rod 36, respectively. The position detecting plates 44 and 45 operate in association with detectors 46 and 47 to detect the copying position where the magnification is 1.0× (hereinafter referred to as "a life-size copying position".)

In the above-described arrangement, as the feed screw 22 is turned to move the zoom lens stand 14, the front lens group L1 is moved along the path E in FIG. 1, as described before, while the rear lens group L2, being regulated by the configuration of the cam plate 29, is moved along the path G. That is, as the zoom lens stand 14 is moved, the cam plate 29 connected through the shaft to the wire pulley 33 is turned through an angle corresponding to the movement of the zoom lens stand 14 because the wire 35 is fixedly secured to the wire pulley 33 at the mid point. Accordingly, the second lens barrel 18 is moved through the cam follower 30 elastically abutted against the cam plate 29 while being regulated by the configuration of the cam plate 29. In this way the distance between the front lens group L1 and the rear lens group L2 is set to a value corresponding to the given magnification.

In the above-described operation, the feed screw 38 is not turned. By turning the feed screw 38, the fine adjustment rod 36 is moved along the optical axis F with respect to the zoom lens stand 14. When the fine adjustment rod 36 is moved with respect to the zoom lens stand 14, the cam plate 29 connected through the shaft to the wire pulley 33 is rotated through an angle corresponding to the movement of the fine adjustment rod 36 because both ends of the wire rope 35 are fastened to the fine adjustment rod 36. As a result, the second lens barrel 18 is moved along the optical axis. Thus, independent of the operation of the feed screw 22, the second lens barrel 18, and accordingly the rear lens group L2 is moved relative to the front lens group L1. That is, the front lens group L1 and the rear lens group L2 can be moved along the predetermined loci E,G by means of the feed screw 22 and the cam plate 29. In addition, the front lens group L1 can be independently positioned by the feed screw 22 driven by the stepping motor 23, and the rear lens group L2 can also be independently positioned by the feed screw 38 driven by the stepping motor 40.

FIG. 6 is a flow chart showing the fundamental operation of the focus and magnification determining and control device according to the invention. When a magnification is selected before a copying operation starts, the front lens group L1 and the rear lens group L2 in the zoom lens L are moved to positions which have been determined through optical calculation in advance. The movement is carried out by the stepping motor 23 only. That is, the movement is a coarse adjustment and is carried out in a conventional manner. In the device of the invention, in addition to the coarse adjustment, the following operation is carried out. The chart C is illuminated by the stationary lamp R2, so that the image of the chart C is applied through the full speed mirror M1 and the optical path changing mirrors M2 and M3 to the line sensor LS. The output signal of the line sensor LS is utilized to operate a focus determining circuit 60, which determines whether or not the object is in focus. The focus status may be determined by detecting the contrast distribution from the line sensor. If the object is not in focus, the stepping motor 40 is operated to adjust the distance between the front lens group L1 and the rear lens group L2 (a fine adjustment) to a value at which the highest contrast is obtained. After the object is brought into focus, a magnification determining circuit 61 is operated. The magnification determining circuit 61 operates to determine whether or not a preset magnification is obtained. If the preselected magnification is not yet obtained, the stepping motor 23 is operated to adjust the position of the zoom lens L (a fine adjustment).

Should the lens come out of the focusing range as a result of the fine adjustment of the position of the zoom lens L, it is necessary to again operate the focus determining circuit 60. After the present magnification and the suitable focus are obtained as a result of the above-described fine adjustments, the copying operation is started.

FIG. 7 is a block diagram showing a circuit for processing focus and magnification signals from the line sensor LS. The line sensor LS is driven by a driver 63 to provide a video output. This output is amplified by an amplifier 64. The output of the line sensor LS is applied through a switch 65 to the focus determining circuit 60, and through a switch 66 to the magnification determining circuit 61. When the switch 65 is turned on, the focus determining circuit 60 is operated. In the focus determining circuit 60, a gate 67 is adapted to pass only a signal corresponding to the chart C. A filter 68 removes the DC signal components, and transmits only signal components corresponding to the video output. A rectifier circuit 69 and an integrating circuit 70 form a focus determination signal.

As the variation (contrast) of the video signal increases, the output of the integrating circuit 70 is increased. That is, when the highest contrast is obtained, the integrating circuit 70 provides the highest output. Therefore, the stepping motor 40 is so driven as to obtain the highest integration output and thus the highest contrast. Instead of the integration of the video output, the difference between the maximum and minimum values thereof can be utilized to obtain the focus determination signal.

When the switch 66 is turned on, the magnification determining circuit 61 is operated. In the magnification determining circuit 61, a gate 71 passes only a signal corresponding to the output of the line sensor. A comparator 72 shapes the waveform from the gate, and a counter 73 counts the white and black lines detected by the line sensor LS. This counting operation is carried out after the focus determining circuit 60 has been operated and the focus thereby determined. That is, the counting operation is achieved with a sharp video output. The output of the counter 73 is compared with a set value (or a count value determined from the present magnification) in a comparator 74. If the output is within the tolerance of the set value, the comparator 74 outputs a magnification coincidence signal. If the output is larger than the tolerance, the comparator 74 provides a negative magnification non-coincidence signal. The feed screw 22 is driven in response to the positive magnification non-coincidence signal or the negative magnification non-coincidence signal, until the magnification coincidence signal is outputted. It should be noted that the switches 65 and 66 are provided for convenience in description. If the driver 63 is operated only when the magnification is changed, then the switches can be eliminated.

In the above-described embodiment, both the front lens group L1 and the rear lens group L2 of the zoom lens L are movable. However, it goes without saying that the technical concept of the invention is applicable to a zoom lens in which one of the lens groups is stationary. Furthermore, in the abovedescribed embodiment, the optical axis F is in parallel with the feed screw 22 and is stationary. However, in a copying machine in which the optical axis F is not in parallel with the feed screw 22 and the feed screw is moved in a direction perpendicular to the axis as the magnification is changed, the same effects as those of the above-described embodiment can be obtained by suitably tilting the feed screw and the optical axis of the zoom lens with the other components maintained unchanged.

Furthermore, in the above-described embodiment, the mechanism for moving the front lens group L1 and the rear lens group L2 comprises a feed screw. However, the mechanism may be replaced by a feed mechanism in which, for instance, wires coupled to the front lens group L1 and the rear lens group L2 are operated directly by stepping motors.

As is apparent from the above description, in the focus and magnification determining and control device provided, according to the invention, for variable magnification type copying machines, movement of the zoom lens and adjustment of the distance between the front lens group and the rear lens group of the zoom lens due to a magnification change are achieved by performing the coarse adjustment based on the optical calculation and the fine adjustment which utilizes the chart image provided through the optical system. Therefore, no matter how the temperature changes, and no matter how the components change over time, or even if the components are lower in accuracy than those which must be used in conventional devices, clear copies can at all times be obtained with correct focus and given magnifications. Elements required for performing the fine adjustment are the chart, its illuminating system, and a sensor for receiving light reflected from the chart and producing a signal indicative of the received image focus and size to control the operation of stepping motors. The signals from the sensor are processed by a computer (all recent copying machines being controlled by computers). Therefore, the technical concept of the invention is applicable to the conventional device without great modification. This is yet another advantage of the invention.

I claim:

1. In a variable magnification type copying machine in which a variable magnification zoom lens is disposed between a platen for receiving an original to be copied and a photosensitive surface, said zoom lens having a plurality of movable lenses, the positions of said movable lenses and the distance between said movable lenses being changeable to provide various copying magnifications, a focus and magnification determining and control device, comprising:
    a focus and magnification determining chart located on said platen;
    a sensor positioned to receive an image of said chart, said sensor generating determination signals indicative of the focus and magnification of said zoom lens;
    means for producing an image of said chart on said sensor; and
    means responsive to said determination signals for adjusting the positions of said movable lenses relative to the platen and photosensitive surface and, for adjusting the distance between movable lenses.

2. The focus and magnification determining and control device as claimed in claim 1, wherein:
    said sensor is positioned at a location optically equivalent to the location of the photosensitive surface relative to said platen whereby the sensor views the image of said chart as the photosensitive surface views an original on said platen to thereby detect the focus and magnification of said zoom lens; and
    said means for producing an image includes a light source, and means for reflecting said image of the chart to said sensor.

3. The focus and magnification determining and control device as claimed in claim 1, wherein said positions adjusting means includes a stepping motor for adjusting the positions of movable lenses relative to said platen and photosensitive surface as well as relative to each other.

4. The focus and magnification determining and control device as claimed in claim 1, wherein said sensor is composed of minute sensor elements arranged in a line.

5. The focus and magnification determining and control device as claimed in claim 1, wherein said chart is comprised of a series of alternating white and black lines.

6. The focus and magnification determining and control device as claimed in claim 5, wherein each line pair of one white line and one black line is 1 mm wide.

7. The focus and magnification determining and control device as claimed in claim 1, wherein said plurality of movable lenses is comprised of a front lens group and a rear lens group, said means for adjusting positions and distance comprising:
    first and second stepping motors responsive respectively to said magnification and focus determination signals,
    means connected to said first stepping motor for repositioning the front lens group in accordance with the magnification determination signals,
    means connected to said second stepping motor for adjusting the distance between said front and rear leans groups in accordance with the focus determination signals.

8. The focus and magnification determining and control device as claimed in claim 7, wherein said means for repositioning the front lens group further includes means for varying the distance between the front and rear leans group in accordance with a preselected distance variation pattern which is a function of the position of the front lens group.

9. The focus and magnification determining and control device as claimed in claim 8, wherein said means for varying the distance between front and rear lens groups includes a cam plate and cam follower.

10. The focus and magnification determining and control device as claimed in claim 9, wherein said means responsive to the second stepping motor for adjusting the distance between first and second line groups includes means connecting the second stepping motor to said cam plate.

11. The focus and magnification determining and control device as claimed in claim 1, wherein said plurality of movable lenses comprise a front lens group (L1) and a rear lens group (L2), said means for adjusting the positions of said front and rear lens groups and for adjusting the distance between said front and rear lens groups comprising:
    a guide rod (11) located parallel to the optical axis of said zoom lens and fixed to a base (12) through brackets (13,13),
    a zoom lens stand (14) slidably mounted on said guide rod, said zoom lens stand being provided with a threaded aperture for receiving a first feed screw (22),
    a first lens barrel (17) fixed to said lens stand (14) for supporting said front lens group,
    a second lens barrel (18) slidably mounted over said first lens barrel for supporting said rear lens group in movable relation to said zoom lens stand (14),
    a shaft (28) extending from said zoom lens stand, a pulley (33) fixed to said shaft, a cam plate (29) rotatably mounted on said shaft (28), a cam follower (30) supported on said second lens barrel (18), a fine adjusting rod (36) slidably supported by said brackets (13,13), a wire (35) wound around said pulley (33) and fixed at both ends to said brackets (13,13), said fine adjusting rod having an aperture for receiving a second feed screw (38), a first stepping motor (23) responsive to said magnification determination signals for rotating said first feed screw to position said front lens group for a selected magnification, and a second stepping motor (40) responsive to said focus determination signal for rotating said second feed screw to adjust the distance between said front and rear lens groups to obtain optimum focus.

12. The focus and magnification determining and control device as claimed in claim 11, wherein said cam plate (29) has a cam surface corresponding to preselected variations in the distance between the front and rear lens groups relative to the positions of the front lens group, whereby the cam plate contacting the cam follower causes the rear lens group to move relative to the front lens group according to the configuration of the cam plate surface as the front lens group moves in response to the movement of the lens stand (14) as the first feed screw rotates.

13. The focus and magnification determining and control device as claimed in claim 11, wherein said adjusting means includes:

a focus determining circuit responsive to said sensor produced focus determination signals and comprising a gate circuit for passing only signals from said sensor, filter means for eliminating any d.c. component from said sensor produced signal, and means responsive to the varying components of said sensor produced signal, for generating signals proportional to the contrast in the image received by said sensor, said second stepping motor being responsive to said contrast signals.

14. The focus and magnification determining and control device as claimed in claim 13, wherein said contrast signal generating means includes rectifier means receiving the output of the filter means and integrator means responsive to the output of said rectifier means.

15. The focus and magnification determining and control device as claimed in claim 13, wherein said contrast signal generating means includes means for indicating the maximum and minimum levels of said sensor produced signals.

16. The focus and magnification determining and control device as claimed in claim 11, wherein said adjusting means includes:

a magnification determining circuit responsive to said sensor produced magnification determination signals and comprising gate means for passing only sensor produced signals, counter means for counting transitions in said sensor produced signals, comparator means for comparing the counted transitions with a selected count and decision means for determining and signaling coincidence and non-coincidence of the counted transitions with the selected count, said first stepping motor being responsive to non-coincidence signals for operating said first feed screw until a coincidence signal is produced.

* * * * *